(12) United States Patent
Pirjaberi et al.

(10) Patent No.: US 9,745,905 B2
(45) Date of Patent: Aug. 29, 2017

(54) SKIP FIRE TRANSITION CONTROL

(71) Applicant: Tula Technology, Inc., San Jose, CA (US)

(72) Inventors: Mohammad R. Pirjaberi, San Jose, CA (US); Louis J. Serrano, Los Gatos, CA (US); Xin Yuan, Palo Alto, CA (US); Steven E. Carlson, Oakland, CA (US); Siamak Hashemi, Farmington Hills, MI (US); Ryan A. Kuhlenbeck, San Francisco, CA (US)

(73) Assignee: Tula Technology, Inc., San Jose, CA (US)

( * ) Notice: Subject to any disclaimer, the term of this patent is extended or adjusted under 35 U.S.C. 154(b) by 194 days.

(21) Appl. No.: 14/857,371

(22) Filed: Sep. 17, 2015

(65) Prior Publication Data
US 2016/0053697 A1 Feb. 25, 2016

Related U.S. Application Data

(63) Continuation-in-part of application No. 13/654,248, filed on Oct. 17, 2012, now Pat. No. 9,528,446, and
(Continued)

(51) Int. Cl.
*F02D 41/00* (2006.01)
*F02D 37/02* (2006.01)
(Continued)

(52) U.S. Cl.
CPC .............. *F02D 37/02* (2013.01); *F02D 17/02* (2013.01); *F02D 41/0002* (2013.01);
(Continued)

(58) Field of Classification Search
CPC ............................. F02D 41/0087; F02D 17/02
(Continued)

(56) References Cited

U.S. PATENT DOCUMENTS

| 4,064,844 A | 12/1977 | Matsumoto et al. |
| 4,129,109 A | 12/1978 | Matsumoto |

(Continued)

OTHER PUBLICATIONS

Pirjaberi et al., U.S. Appl. No. 15/357,398, filed on Nov. 21, 2016.
(Continued)

*Primary Examiner* — Thomas Moulis
(74) *Attorney, Agent, or Firm* — Beyer Law Group LLP

(57) ABSTRACT

Methods and arrangements are described for controlling transitions between firing fractions during skip fire operation of an engine in order to help smooth the transitions. Generally, firing fractions transitions are implemented gradually, preferably in a manner that relatively closely tracks manifold filling dynamics. In some embodiments, the commanded firing fraction is altered each firing opportunity. Another approach contemplates altering the commanded firing fraction by substantially the same amount each firing opportunity for at least a portion of the transition. These approaches work particularly well when the commanded firing fraction is provided to a skip fire controller that includes an accumulator functionality that tracks the portion of a firing that has been requested, but not delivered, or vice versa. In various embodiments, commanded firing fraction changes are delayed relative to initiation of the change in throttle position to help compensate for inherent delays associated with changing the manifold air pressure.

24 Claims, 8 Drawing Sheets

Related U.S. Application Data a continuation of application No. PCT/US2015/050181, filed on Sep. 15, 2015.

(60) Provisional application No. 61/548,187, filed on Oct. 17, 2011, provisional application No. 61/640,646, filed on Apr. 30, 2012, provisional application No. 62/053,351, filed on Sep. 22, 2014.

(51) Int. Cl.
*F02P 5/15* (2006.01)
*F02D 17/02* (2006.01)
*F02D 41/28* (2006.01)

(52) U.S. Cl.
CPC ........ *F02D 41/0087* (2013.01); *F02P 5/1504* (2013.01); *F02D 2041/286* (2013.01); *F02D 2200/0406* (2013.01); *F02D 2200/101* (2013.01); *Y02T 10/42* (2013.01); *Y02T 10/46* (2013.01)

(58) Field of Classification Search
USPC .............................................. 123/198 F, 481
See application file for complete search history.

(56) References Cited

U.S. PATENT DOCUMENTS

| | | |
|---|---|---|
| 4,306,529 A | 12/1981 | Chiesa et al. |
| 4,337,740 A | 7/1982 | Sugasawa et al. |
| 4,391,255 A | 7/1983 | Staerzl |
| 4,434,767 A | 3/1984 | Kohama et al. |
| 4,489,695 A | 12/1984 | Kohama et al. |
| 4,509,488 A | 4/1985 | Forster et al. |
| 4,541,387 A | 9/1985 | Morikawa |
| 5,117,790 A | 6/1992 | Clarke et al. |
| 5,278,760 A | 1/1994 | Ribbens et al. |
| 5,337,720 A | 8/1994 | Murakami et al. |
| 5,374,224 A | 12/1994 | Huffmaster et al. |
| 5,377,631 A | 1/1995 | Schechter |
| 5,408,966 A | 4/1995 | Lipinski et al. |
| 5,408,974 A | 4/1995 | Lipinski et al. |
| 5,540,633 A | 7/1996 | Yamanaka et al. |
| 5,584,266 A | 12/1996 | Motose et al. |
| 5,597,371 A | 1/1997 | Toukura |
| 5,692,471 A | 12/1997 | Zhang |
| 5,720,257 A | 2/1998 | Motose et al. |
| 5,778,858 A | 7/1998 | Garabedian |
| 5,803,040 A | 9/1998 | Biesinger et al. |
| 5,975,052 A | 11/1999 | Moyer |
| 6,138,636 A | 10/2000 | Kohno et al. |
| 6,158,411 A | 12/2000 | Morikawa |
| 6,244,242 B1 | 6/2001 | Grizzle et al. |
| 6,360,724 B1 | 3/2002 | Suhre et al. |
| 6,408,625 B1 | 6/2002 | Woon et al. |
| 6,484,677 B2 | 11/2002 | Leone et al. |
| 6,532,944 B1 | 3/2003 | Leone et al. |
| 6,615,776 B1 | 9/2003 | Von Andrian-Werburg |
| 6,615,804 B2 | 9/2003 | Matthews et al. |
| 6,619,258 B2 | 9/2003 | McKay et al. |
| 6,655,353 B1 | 12/2003 | Rayl |
| 6,718,937 B2 | 4/2004 | Kim |
| 6,735,938 B2 | 5/2004 | Surnilla |
| 6,736,108 B2 | 5/2004 | Rayl et al. |
| 6,769,398 B2 | 8/2004 | Surnilla et al. |
| 6,978,204 B2 | 12/2005 | Surnilla et al. |
| 7,028,670 B2 | 4/2006 | Doering |
| 7,044,101 B1 | 5/2006 | Duty et al. |
| 7,063,062 B2 | 6/2006 | Lewis et al. |
| 7,066,136 B2 | 6/2006 | Ogiso |
| 7,085,647 B1 | 8/2006 | Prucka et al. |
| 7,086,386 B2 | 8/2006 | Doering |
| 7,231,907 B2 | 6/2007 | Bolander et al. |
| 7,278,391 B1 | 10/2007 | Wong et al. |
| 7,363,915 B2 | 4/2008 | Surnilla et al. |
| 7,426,915 B2 | 9/2008 | Gibson et al. |
| 7,503,312 B2 | 3/2009 | Surnilla et al. |
| 7,530,413 B2 | 5/2009 | Rayl |
| 7,571,707 B2 | 8/2009 | Gibson et al. |
| 7,785,230 B2 | 8/2010 | Gibson et al. |
| 7,899,607 B2 | 3/2011 | Shin et al. |
| 7,930,087 B2 | 4/2011 | Gibson et al. |
| 8,099,224 B2 | 1/2012 | Tripathi et al. |
| 8,150,605 B2 | 4/2012 | Doering et al. |
| 8,215,284 B2 | 7/2012 | Suzuki et al. |
| 8,839,766 B2 | 9/2014 | Serrano et al. |
| 8,869,773 B2 | 10/2014 | Tripathi et al. |
| 9,086,020 B2 * | 7/2015 | Pirjaberi ............. F02D 41/0087 |
| 9,528,446 B2 | 12/2016 | Pirjaberi et al. |
| 9,562,470 B2 | 2/2017 | Younkins et al. |
| 2002/0096134 A1 | 7/2002 | Michelini et al. |
| 2003/0213467 A1 | 11/2003 | Rayl et al. |
| 2005/0199220 A1 | 9/2005 | Ogiso |
| 2006/0005811 A1 | 1/2006 | Hartmann |
| 2008/0154468 A1 | 6/2008 | Berger et al. |
| 2008/0185194 A1 | 8/2008 | Leone |
| 2009/0177371 A1 | 7/2009 | Reinke |
| 2010/0050993 A1 | 3/2010 | Zhao et al. |
| 2011/0251773 A1 * | 10/2011 | Sahandiesfanjani .... F02D 17/02 701/102 |
| 2012/0031357 A1 | 2/2012 | Ervin et al. |
| 2013/0289853 A1 | 10/2013 | Serrano |
| 2014/0053802 A1 | 2/2014 | Rayl |
| 2014/0053805 A1 | 2/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190449 A1 | 7/2014 | Phillips |
| 2014/0207359 A1 | 7/2014 | Phillips |
| 2014/0261316 A1 | 9/2014 | Shost |
| 2015/0152796 A1 | 6/2015 | Zhang |
| 2016/0003168 A1 | 1/2016 | Leone et al. |

OTHER PUBLICATIONS

Serrano et al., U.S. Appl. No. 15/298,542, filed on Oct. 20, 2016.
Serrano et al., U.S. Appl. No. 15/288,847, filed on Oct. 7, 2016.
Serrano, U.S. Appl. No. 15/299,259, filed on Oct. 20, 2016.
International Search Report dated Dec. 18, 2015 from International Application No. PCT/US2015/50181.
Written Opinion dated Dec. 18, 2015 from International Application No. PCT/US2015/50181.

* cited by examiner

FIG. 8

| Initial firing fraction | Final firing fraction | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | 0 | 1/9 | 1/8 | 1/7 | 1/6 | 1/5 | 2/9 | 1/4 | 2/7 | 1/3 | 3/8 | 2/5 | 3/7 | 4/9 | 1/2 | 5/9 | 4/7 | 3/5 | 5/8 | 2/3 | 5/7 | 3/4 | 7/9 | 4/5 | 5/6 | 6/7 | 7/8 | 8/9 | 1 |
| 0 | | 100 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1/9 | 100 | | 100 | 1 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| 1/8 | 100 | 100 | | 100 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| 1/7 | 2 | 2 | 100 | | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| 1/6 | 2 | 2 | 2 | 100 | | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| 1/5 | 2 | 2 | 2 | 2 | 100 | | 2 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| 2/9 | 2 | 2 | 2 | 2 | 2 | 2 | | 2 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| 1/4 | 2 | 2 | 2 | 2 | 2 | 2 | 2 | | 2 | 1 | 1 | 1 | 1 | 1 | 1 | 1 | 1 | 1 | 1 | 1 | 1 | 1 | 1 | 1 | 1 | 2 | 2 | 2 | 2 | 2 |
| 2/7 | 2 | 2 | 2 | 2 | 2 | 2 | 2 | 2 | | 1 | 1 | 1 | 1 | 1 | 1 | 1 | 1 | 1 | 1 | 1 | 1 | 1 | 1 | 1 | 1 | 2 | 2 | 2 | 2 | 2 |
| 1/3 | 2 | 2 | 2 | 2 | 2 | 2 | 2 | 2 | 2 | | 1 | 1 | 1 | 1 | 1 | 1 | 1 | 1 | 1 | 1 | 1 | 1 | 1 | 1 | 1 | 2 | 2 | 2 | 2 | 2 |
| 3/8 | 2 | 2 | 2 | 2 | 2 | 2 | 2 | 2 | 2 | 2 | | 1 | 1 | 1 | 1 | 1 | 1 | 1 | 1 | 1 | 1 | 1 | 1 | 1 | 1 | 2 | 2 | 2 | 2 | 2 |
| 2/5 | 2 | 2 | 2 | 2 | 2 | 2 | 2 | 2 | 2 | 2 | 2 | | 1 | 1 | 1 | 1 | 1 | 1 | 1 | 1 | 1 | 1 | 1 | 1 | 1 | 2 | 2 | 2 | 2 | 2 |
| 3/7 | 2 | 2 | 2 | 2 | 2 | 2 | 2 | 2 | 2 | 2 | 2 | 2 | | 1 | 1 | 1 | 1 | 1 | 1 | 1 | 1 | 1 | 1 | 1 | 1 | 2 | 2 | 2 | 2 | 2 |
| 4/9 | 2 | 2 | 2 | 2 | 2 | 2 | 2 | 2 | 2 | 2 | 2 | 2 | 2 | | 1 | 1 | 1 | 1 | 1 | 1 | 1 | 1 | 1 | 1 | 1 | 2 | 2 | 2 | 2 | 2 |
| 1/2 | 2 | 2 | 2 | 2 | 2 | 2 | 2 | 2 | 2 | 2 | 2 | 2 | 2 | 2 | | 1 | 1 | 1 | 1 | 1 | 1 | 1 | 1 | 1 | 1 | 2 | 2 | 2 | 2 | 2 |
| 5/9 | 2 | 2 | 2 | 2 | 2 | 2 | 2 | 2 | 2 | 2 | 2 | 2 | 2 | 2 | 100 | | 1 | 1 | 1 | 1 | 1 | 1 | 1 | 1 | 1 | 2 | 2 | 2 | 2 | 2 |
| 4/7 | 2 | 2 | 2 | 2 | 2 | 2 | 2 | 2 | 2 | 2 | 2 | 2 | 2 | 2 | 2 | 2 | | 1 | 1 | 1 | 1 | 1 | 1 | 1 | 1 | 2 | 2 | 2 | 2 | 2 |
| 3/5 | 2 | 2 | 2 | 2 | 2 | 2 | 2 | 2 | 2 | 2 | 2 | 2 | 2 | 2 | 2 | 2 | 2 | | 1 | 1 | 1 | 1 | 1 | 1 | 1 | 2 | 2 | 2 | 2 | 2 |
| 5/8 | 2 | 2 | 2 | 2 | 2 | 2 | 2 | 2 | 2 | 2 | 2 | 2 | 2 | 2 | 2 | 2 | 2 | 2 | | 1 | 1 | 1 | 1 | 1 | 1 | 2 | 2 | 2 | 2 | 2 |
| 2/3 | 2 | 2 | 2 | 2 | 2 | 2 | 2 | 2 | 2 | 2 | 2 | 2 | 2 | 2 | 2 | 2 | 2 | 2 | 2 | | 1 | 1 | 1 | 1 | 1 | 2 | 2 | 2 | 2 | 2 |
| 5/7 | 2 | 2 | 2 | 2 | 2 | 2 | 2 | 2 | 2 | 2 | 2 | 2 | 2 | 2 | 2 | 2 | 2 | 2 | 2 | 2 | | 1 | 1 | 1 | 1 | 2 | 2 | 2 | 2 | 2 |
| 3/4 | 4 | 4 | 4 | 4 | 4 | 4 | 4 | 2 | 2 | 2 | 2 | 2 | 2 | 2 | 2 | 2 | 2 | 2 | 2 | 2 | 2 | | 1 | 1 | 1 | 1 | 2 | 2 | 2 | 2 |
| 7/9 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | | 1 | 1 | 1 | 1 | 2 | 2 | 2 |
| 4/5 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | 2 | | 1 | 1 | 1 | 1 | 2 | 2 |
| 5/6 | 4 | 4 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | | 1 | 1 | 1 | 1 | 2 |
| 6/7 | 4 | 4 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | 100 | | 1 | 1 | 1 | 1 |
| 7/8 | 4 | 4 | 4 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | 100 | | 100 | 1 | 1 |
| 8/9 | 4 | 4 | 4 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | 2 | 100 | | 100 | 1 |
| 1 | 4 | 4 | 4 | 4 | 4 | 4 | 4 | 4 | 4 | 4 | 2 | 2 | 2 | 2 | 2 | 2 | 2 | 2 | 2 | 2 | 2 | 2 | 2 | 2 | 2 | 2 | 100 | 100 | | 100 |

800, 880

SKIP FIRE TRANSITION CONTROL

CROSS REFERENCE TO RELATED APPLICATIONS

This application is a continuation-in-part of U.S. patent application Ser. No. 13/654,248 filed Oct. 17, 2012, which claims priority of Provisional Application Nos. 61/548,187 filed Oct. 17, 2011 and 61/640,646 filed Apr. 30, 2012. This application claims priority of U.S. Provisional Application No. 62/053,351 filed Sep. 22, 2014. This application is also a Continuation of International Application No. PCT/US15/50181, filed on Sep. 15, 2015. All of these referenced priority applications are incorporated herein by reference.

FIELD OF THE INVENTION

The present invention relates generally to methods and arrangements for controlling transitions between firing fractions during skip fire operation of an engine.

BACKGROUND

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement today is deactivating a group of cylinders substantially simultaneously. In this approach no fuel is delivered to the deactivated cylinders and their associated intake and exhaust valves are kept closed as long as the cylinders remain deactivated. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed mode displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. In this manner, even finer control of the effective engine displacement is possible. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The applicant has filed a number of patents describing various approaches to skip fire control.

A known characteristic of skip fire control is that engines operating under skip fire control tend to have less desirable noise, vibration and harshness (NVH) characteristics than "normal", all-cylinder operation of an engine. Thus, there are continuing efforts to develop techniques and mechanisms that can help reduce NVH concerns during skip operation while still maintaining some of its benefits. Typically, the available skip fire firing fractions/sequences/patterns are chosen at least in part based on their preferred NVH characteristics. While this reduces NVH while operating at these available firing fractions, NVH issues can arise during transitions between different firing fractions. The present application describes techniques that can help manage NVH concerns while delivering the desired performance during transitions between different firing fractions.

SUMMARY

A variety of methods and arrangements are described for controlling transitions between firing fractions during skip fire operation of an engine in order to help reduce undesirable NVH consequences and otherwise smooth the transitions. In general, firing fractions transitions are implemented gradually, preferably in a manner that relatively closely tracks manifold filling dynamics.

In some preferred implementations the commanded firing fraction is altered each firing opportunity. Another described approach contemplates altering the commanded firing fraction by substantially the same amount each firing opportunity for at least a portion of the transition. These approaches work particularly well when the commanded firing fraction is provided to a skip fire firing timing determining module that includes an accumulator functionality that tracks a portion of a firing that has been requested, but not delivered, or that has been delivered, but not requested.

In various embodiments, commanded firing fraction changes are delayed relative to initiation of the change in throttle position to help compensate for inherent delays associated with changing the manifold air pressure.

In some implementations, the commanded firing fraction is altered in a manner such that a product of the skipping fraction and the intake manifold pressure remains substantially constant throughout the transition.

In some implementations, the commanded firing fraction is changed each firing opportunity using a linear slew rate such that the amount that the commanded firing fraction is changed each firing opportunity is the same throughout the transition. The actual slew rate that is appropriate for any particular transition may vary based on factors such as the magnitude of the desired firing fraction change and various engine operating parameters such as engine speed, etc.

A variety of other engine control techniques including spark retard, feed forward throttle control, feed forward camshaft control, pumping air through skipped cylinders and others may be used to help further smooth the transition.

Techniques are also described for handling situations in which the target firing fraction changes in the middle of a transition.

BRIEF DESCRIPTION OF THE DRAWINGS

The invention and the advantages thereof, may best be understood by reference to the following description taken in conjunction with the accompanying drawings in which:

FIG. 8 is an exemplary look up table of firing fraction slew rates for different initial and target firing fractions in accordance with one embodiment of the invention.

In the drawings, like reference numerals are sometimes used to designate like structural elements. It should also be appreciated that the depictions in the figures are diagrammatic and not to scale.

DETAILED DESCRIPTION

When a limited set of firing fractions are available, transitions between different firing fractions typically also involve the adjustment of selected engine operating parameters. This is because at any particular firing density, there will be associated operating parameters (e.g., air charge, spark timing, etc.) that are appropriate to efficiently deliver the desired engine output. Therefore, when a change is made in the firing density, it is typically desirable to substantially simultaneously adjust selected engine operating parameters so that the desired engine output is maintained at the new firing fraction. Without such an adjustment, operating at the same engine settings would typically result in the generation of more torque than desired when the firing density is increased, and less torque than desired when the firing density is reduced.

From a control standpoint, the firing density can be changed very quickly by simply altering the selection of the specific cylinders to be fired—however corresponding changes in the air charge tend to be realized more slowly due to the latencies inherent in filling or emptying the intake manifold. This is particularly noticeable when the desired firing fraction changes significantly, as for example from ½ to 1 or from ⅓ to ⅔, which require correspondingly large changes in air charge/manifold pressure. Generally, any mismatch between the firing density and the targeted cylinder air charge during a transition, will result in a low frequency torque disturbance (unless otherwise compensated for), which may be perceived as NVH. If the mismatch would result in a torque surge, then the spark timing can be retarded to maintain the desired torque. However, an undesirable side effect of retarding spark to reduce engine output is that retarding spark will generally reduce fuel efficiency. Also, excessive spark retard will lead to misfires further reducing efficiency and potentially adversely affecting the engine.

Figure 2:
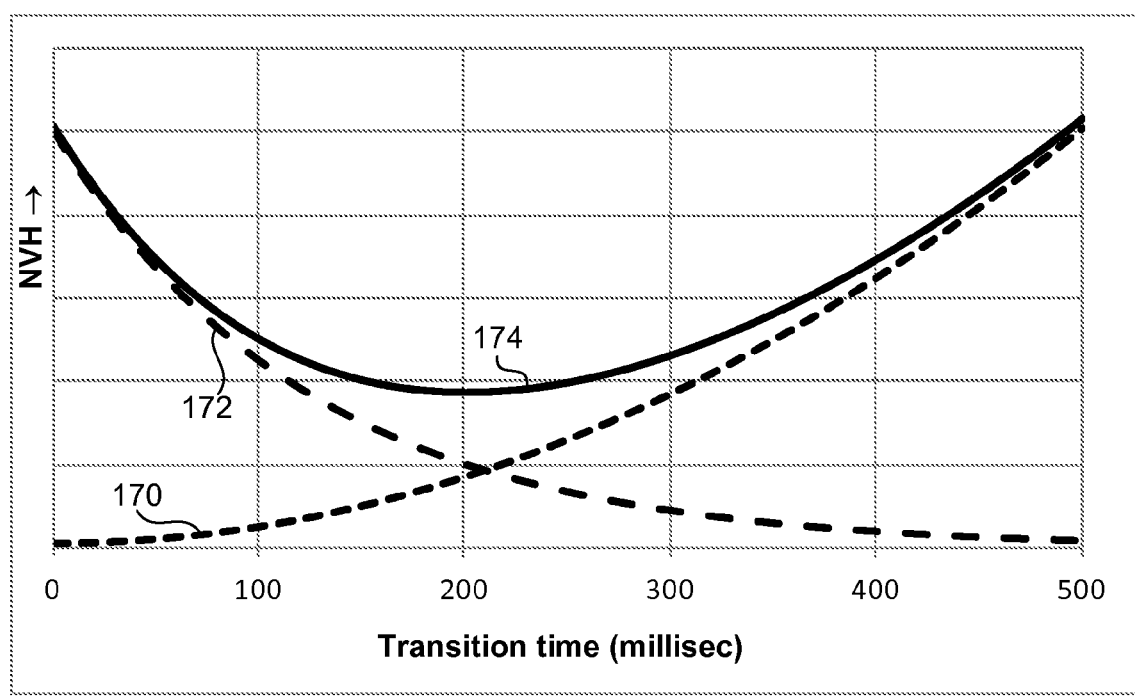
FIG. 2 schematically illustrates the impact of pattern vibration and torque mismatch vibration during a transition.

The torque mismatch problem can also be mitigated somewhat by slowing the transition between firing fractions. Slowing the transition allows changes in the firing density to more closely track changes in the intake manifold pressure. However, even if the air/torque is precisely matched with changes in the firing fraction, any change from one firing density to another will cause a low frequency vibration, since the intermediate firing fractions have undesirable firing patterns. Slowing the transition tends to exacerbate these types of disturbances. The perceived total NVH may be thought of as the summation of these two effects. Components from the transition firing patterns, $NVH_{pattern}$, and from the transition torque mismatch, $NVH_{mismatch}$, can be thought to add to form a total $NVH_{total}$, i.e. $NVH_{total} = NVH_{pattern} + NVH_{mismatch}$. FIG. 2, which plots NVH as a function of the transition time, schematically illustrates the situation. For short transition times, the $NVH_{pattern}$ curve 170 is low and the $NVH_{mismatch}$ curve 172 is high. For long transition times, the situation is reversed. The $NVH_{total}$ curve 174 shows a minimum value, often in the vicinity of 200 milliseconds as shown in FIG. 2. Thus it is often desirable to have a transition length in the vicinity of 200 msec, for example from about 150 msec to about 300 msec. It should be appreciated that some transitions may be longer or shorter and that in some cases the total NVH may not strictly be the sum of pattern and mismatch NVH, but such a conceptualization is generally qualitatively accurate.

Figure 1:
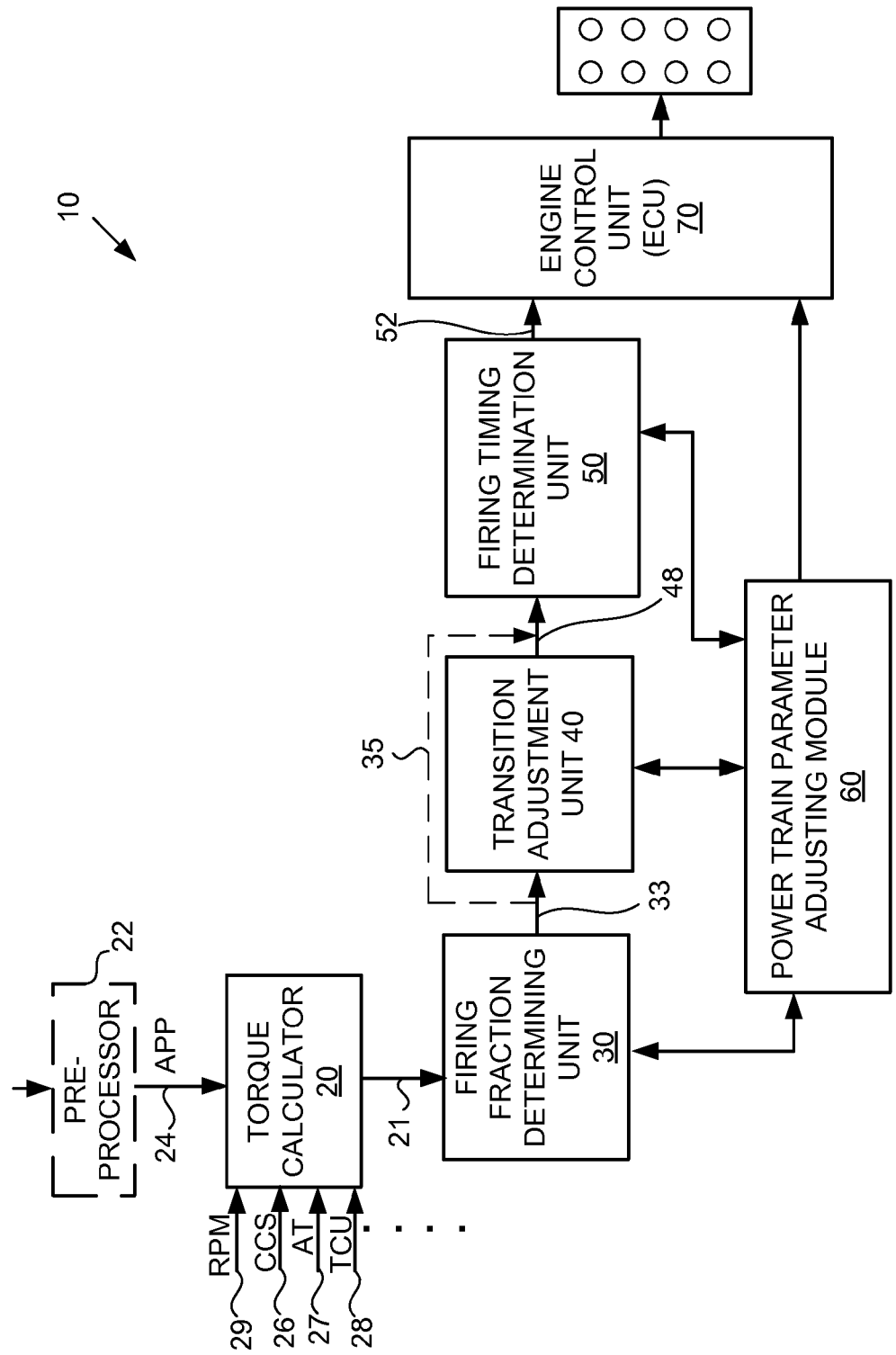
FIG. 1 is a functional block diagram of a skip fire controller in accordance with one embodiment of the present invention.

The applicant has previously described a variety of skip fire controllers. A skip fire controller 10 suitable for implementing the present invention is functionally illustrated in FIG. 1. The illustrated skip fire controller 10 includes a torque calculator 20, a firing fraction determining unit 30, a transition adjustment unit 40, a firing timing determination unit 50, and a power train parameter adjusting module 60. For the purposes of illustration, skip fire controller 10 is shown separately from engine control unit (ECU) 70. However, it should be appreciated that in many embodiments the functionality of the skip fire controller 10 may be incorporated into the ECU 70. Indeed incorporation of the skip fire controller into an ECU or power train control unit is expected to be the most common implementation.

The torque calculator 20 is arranged to determine the desired engine torque at any given time based on a number of inputs. The torque calculator outputs a requested torque 21 to the firing fraction determining unit 30. The firing fraction determining unit 30 is arranged to determine a firing fraction that is suitable for delivering the desired torque based on the current operating conditions and outputs a firing fraction 33 that is appropriate for delivering the desired torque. The firing timing determining unit 50 is responsible for determining a firing sequence that delivers the desired firing fraction. The firing sequence can be determined using any suitable approach. In some preferred implementations, the firing decisions are made dynamically on an individual firing opportunity by firing opportunity basis which allows desired changes to be implemented very quickly. A variety of firing timing determining units that are well suited for determining appropriate firing sequence based on potentially time varying requested firing fraction or engine outputs have been previously described by the Applicant. Many such firing timing determining units are based on a sigma delta converter which is well suited for making firing decisions on a firing opportunity by firing opportunity basis. In some cases the initial accumulator value in the sigma delta converter may be set at the beginning of a transition in order to generate a firing pattern with low NVH during the transition. In other implementations, pattern generators or predefined patterns may be used to facilitate delivery of the desired firing fraction.

The torque calculator 20 receives a number of inputs that may influence or dictate the desired engine torque at any time. In automotive applications, one of the primary inputs to the torque calculator is the accelerator pedal position (APP) signal 24 which indicates the position of the accelerator pedal. In some implementations the accelerator pedal position signal is received directly from an accelerator pedal position sensor (not shown) while in others an optional preprocessor 22 may modify the accelerator pedal signal prior to delivery to the skip fire controller 10. Other primary inputs may come from other functional blocks such as a cruise controller (CCS command 26), the transmission controller (AT command 27), a traction control unit (TCU command 28), etc. There are also a number of factors such as engine speed that may influence the torque calculation. When such factors are utilized in the torque calculations, the appropriate inputs, such as engine speed (RPM signal 29) are also provided or are obtainable by the torque calculator as necessary.

Further, in some embodiments, it may be desirable to account for energy/torque losses in the drive train and/or the energy/torque required to drive engine accessories, such as the air conditioner, alternators/generator, power steering pump, water pumps, vacuum pumps and/or any combination of these and other components. In such embodiments, the torque calculator may be arranged to either calculate such values or to receive an indication of the associated losses so that they can be appropriately considered during the desired torque calculation.

The nature of the torque calculation will vary with the operational state of the vehicle. For example, during normal operation, the desired torque may be based primarily on the driver's input, which may be reflected by the accelerator pedal position signal 24. When operating under cruise control, the desired torque may be based primarily on the input from a cruise controller. When a transmission shift is imminent, a transmission shifting torque calculation may be used to determine the desired torque during the shifting operation. When a traction controller or the like indicates a potential loss of traction event, a traction control algorithm may be used to determine the desired torque as appropriate to handle the event. In some circumstances, depression of a brake pedal may invoke specific engine torque control. When other events occur that require measured control of the engine output, appropriate control algorithms or logic may be used to determine the desired torque throughout such events. In any of these situations, the required torque determinations may be made in any manner deemed appropriate for the particular situation. For example, the appropriate torque determinations may be made algorithmically, using lookup tables based on current operating parameters, using appropriate logic, using set values, using stored profiles, using any combinations of the foregoing and/or using any other suitable approach. The torque calculations for specific applications may be made by the torque calculator itself, or may be made by other components (within or outside the ECU) and simply reported to the torque calculator for implementation.

The firing fraction determining unit 30 receives requested torque signal 21 from the torque calculator 20 and other inputs such as engine speed and various power train operating parameters and/or environmental conditions that are useful in determining an appropriate operational firing fraction 33 to deliver the requested torque under the current conditions. The firing fraction is indicative of the fraction or percentage of firings that are to be used to deliver the desired output. Often, the firing fraction determining unit will be constrained to a limited set of available firing fractions, patterns or sequences that have been selected based at least in part on their relatively more desirable NVH characteristics (collectively sometimes referred to herein generically as the set of available firing fractions). There are a number of factors that may influence the set of available firing fractions. These typically include the requested torque, cylinder load, engine speed (e.g. RPM) and current transmission gear. They may potentially also include various environmental conditions such as ambient pressure or temperature and/or other selected power train parameters. The firing fraction determining unit 30 is arranged to select the desired operational firing fraction 33 based on such factors and/or any other factors that the skip fire controller designer may consider important. By way of example, a few suitable firing fraction determining units are described in co-pending application Ser. Nos. 13/654,244; 13/654,248, 13/963,686 and 14/638,908, each of which are incorporated herein by reference.

The number of available firing fractions/patterns and the operating conditions during which they may be used may be widely varied based on various design goals and NVH considerations. In one particular example, the firing fraction determining unit may be arranged to limit available firing fractions to a set of 29 possible operational firing fractions— each of which is a fraction having a denominator of 9 or less—i.e., 0, $\frac{1}{9}$, $\frac{1}{8}$, $\frac{1}{7}$, $\frac{1}{6}$, $\frac{1}{5}$, $\frac{2}{9}$, $\frac{1}{4}$, $\frac{2}{7}$, $\frac{1}{3}$, $\frac{3}{8}$, $\frac{2}{5}$, $\frac{3}{7}$, $\frac{4}{9}$, $\frac{1}{2}$, $\frac{5}{9}$, $\frac{4}{7}$, $\frac{3}{5}$, $\frac{5}{8}$, $\frac{2}{3}$, $\frac{5}{7}$, $\frac{3}{4}$, $\frac{7}{9}$, $\frac{4}{5}$, $\frac{5}{6}$, $\frac{6}{7}$, $\frac{7}{8}$, $\frac{8}{9}$ and 1. However, at certain (indeed most) operation conditions, the set of available firing fraction may be reduced and sometimes the available set is greatly reduced. In general, the set of available firing fractions tends to be smaller in lower gears and at lower engine speeds. For example, there may be operating ranges (e.g. near idle and/or in first gear) where the set of available firing fractions is limited to just two available fractions—(e.g., $\frac{1}{2}$ or 1) or to just 4 possible firing fractions—e.g., $\frac{1}{3}$, $\frac{1}{2}$, $\frac{2}{3}$ and 1. Of course, in other embodiments, the permissible firing fractions/patterns for different operating conditions may be widely varied.

Since the available set of firing fractions is limited, various power train operating parameters such as mass air charge (MAC) and/or spark timing will typically need to be varied to insure that the actual engine output matches the desired output. In the illustrated embodiment, a power train parameter adjusting module 60 is provided that cooperates with the firing fraction calculator 30. The power train parameter adjusting module 60 directs the ECU 70 to set selected power train parameters appropriately to insure that the actual engine output substantially equals the requested engine output at the commanded firing fraction. By way of example, the power train parameter adjusting module 60 may be responsible for determining the desired MAC, spark timing and/or other engine settings that are desirable to help ensure that the actual engine output matches the requested engine output. Although the powertrain parameter adjusting module 60 is illustrated as a separate component, it is often implemented as a part of engine control unit 70. Of course, in other embodiments, the power train parameter adjusting module 60 may be arranged to directly control various engine settings.

The firing timing determining module 50 is arranged to issue a sequence of firing commands 52 that cause the engine to deliver the percentage of firings dictated by a commanded firing fraction 48. The firing timing determining module 50 may take a wide variety of different forms. By way of example, sigma delta convertors work well as the firing timing determining module 50. A number of the assignee's patents and patent applications describe various suitable firing timing determining modules, including a wide variety of different sigma delta based converters that work well as the firing timing determining module. See, e.g., U.S. Pat. Nos. 7,577,511, 7,849,835, 7,886,715, 7,954,474, 8,099,224, 8,131,445, 8,131,447, 8,839,766 and pending application Ser. No. 13/774,134 filed Feb. 22, 2013. The sequence of firing commands (sometimes referred to as a drive pulse signal 52) outputted by the firing timing determining module 50 may be passed to an engine control unit (ECU) 70 or another module such as a combustion controller (not shown in FIG. 1) which orchestrates the actual firings. A significant advantage of using a sigma delta converter or an analogous structure is that it inherently includes an accumulator function that tracks the portion of firing that have been requested but not yet delivered. Such an arrangement helps smooth transitions by accounting for the effects of previous fire/no fire decisions.

As suggested above, abrupt transitions between firing fractions can lead to undesirable vibrations and/or torque surges or dips, i.e. undesirable $NVH_{total}$ as discussed relative to FIG. 2. The torque surge/dip arises since often the change in torque request, at least during the transition, is smaller than the change in the firing fraction. The firing fraction change would thus cause the engine to overshoot/undershoot the requested torque level. Therefore, in the embodiment illustrated in FIG. 1, transition adjustment unit 40 is arranged to help mitigate vibrations and torque surges/dips associated with step changes in the requested firing fraction 33. When a step change in requested firing fraction occurs, the transition adjustment unit 40 has the effect of spreading the change in firing fraction over a short period. This "spreading" (which may include a brief delay) can help smooth transitions between different commanded firing fractions and can help compensate for various delays associated with manifold filling. These may include mechanical delays in the changing of the engine parameters and/or inertial type manifold filling/emptying delays. When the requested firing fraction is at steady state, the commanded firing fraction 48 is the same as the requested firing fraction 33. However, when a transition occurs, the commanded firing fraction 48 is effectively ramped from the previous requested firing fraction to the target firing fraction.

If the nature of the transition is such that the transition adjustment unit imposed delays are acceptable, smoother operation can be obtained by using such an arrangement. However, if the nature of the transition is such that a quicker response is desired (as for example, when the driver stomps on the accelerator pedal or during traction control events), it may be desirable to bypass or modify the settings of the transition adjustment unit 40 to provide a quicker response. Therefore, some implementations incorporate separate "fast path" and "slow path" approaches for managing firing fraction change requests. In such applications, the transition adjustment unit can be bypassed for "fast path" responses and used in "slow path" changes. More generally, the transition adjustment unit 40 characteristics may vary depending on inputs governing the desired transition, i.e. the desired firing fraction slew rate may vary with the rate of change and/or magnitude of change of the accelerator pedal position.

To account for some of the intake manifold filling dynamics described above, the applicant has previously proposed using a filter at the location of transition adjustment unit 40 that roughly mimics the air filling dynamics to smooth transitions between firing fractions. By way of example, such an approach is described in U.S. patent application Ser. Nos. 13/654,244 and 13/654,248 which are incorporated herein by reference. In general, the requested firing fraction is passed through one or two filters before reaching the firing timing determining unit so that step changes in the requested firing fraction are more gradually presented to the firing timing determining module. Another transition management approach is described in co-pending application Ser. No. 14/203,444.

The filtering approach described in the incorporated patents works well to help mitigate vibrations. The Applicant has found that even better results can sometimes be obtained utilizing some of the slew rate based techniques described below.

In one aspect a designated firing fraction slew rate is used to help smooth the transition between firing fractions. In some implementations a brief delay is also included before initiating the slewed transition. The appropriate slew rate for any transition can depend on a number of operating parameters including current engine speed, intake/exhaust valve timing, torque demand, starting firing fraction and target firing fraction, the mass air charge, etc. The slew rate may also depend on vehicle parameters, such as manifold size, acoustic and vibration transfer paths between NVH sources and the cabin occupants, and vehicle style, i.e. sedan, sports car, luxury car, etc. By way of example, linear slew rates on the order of 1-5 percent of the firing fraction per firing opportunity work well in many applications. A linear slew rate of 2% will make a transition from a firing fraction of 0 to 1 over the course of 50 firing opportunities from the time that the transition begins, which would be just over 6 engine cycles in an eight cylinder engine. A slew rate of 1% will take twice as long to transition, while a slew rate of 4% would result in transitions that take half as long. By way of example, if a transition is being made from a firing fraction of ½ to a firing fraction of 1, at a slew rate of 2% would suggest that the commanded firing fraction for the first firing opportunity after any imposed delay would be 52%, the commanded firing fraction for the second firing opportunity would be 54% and so on until the desired firing fraction of 1 is obtained. Of course, the slew rate in other instances would vary with the initial and target firing fractions.

An appropriate slew rate can be determined by looking at the manifold pressure response to throttle movement during a transition. By measuring intake manifold absolute pressure (MAP) as a function of time a determination of how fast the engine can pump down the manifold pressure can be made. Engines with a small intake manifold or ones that operate at a high engine speed, may use a higher slew rate than engines with a large intake manifold or when operating at low RPM. Generally, an intake manifold will fill faster than it will empty. Increases in firing fraction typically require emptying the intake manifold and decreases in firing fraction typically require filling the intake manifold to avoid a torque bump or dip. Therefore, it is often desirable to utilize a slower slew rate for increases in firing fraction (which typically correspond to lower desired air charges/manifold pressures) than for decreases in firing fraction (which typically correspond to higher desired air charges/manifold pressures). As suggested above, a variety of other factors including engine speed, intake/exhaust valve timing, current air charges, the current and target firing fractions can also influence the manifold filling/emptying dynamics so the transition adjustment unit 40 may be arranged to set the appropriate slew rate based in part on any of these—or other appropriate factors.

An appropriate slew rate may be determined using a variety of techniques. In some cases a look-up table may be used to determine the appropriate slew rate between initial and target firing fractions. FIG. 8 illustrates such a table 800, where the slew rate is expressed in the percentage change in firing fraction per firing opportunity. Of course, the slew rate could be expressed in terms of other variables, such as time, crank angle, etc. The entries in table 800 should be considered exemplary only and may in practice be different from those given in FIG. 8. Table 800 lists 29 possible first, initial firing fractions and 29 possible second, target firing fractions. The central diagonal 880 shows no entries, since it corresponds to the initial and target firing fractions being equal, i.e. no transition. The entries above diagonal 880 correspond to increases in firing fraction and the entries below the diagonal correspond to decreases in firing fraction. As previously mentioned generally the intake manifold fills more quickly than it empties, so the slew rates above the diagonal are generally smaller than those below the diagonal. Another feature evident in the table is increasing slew rates for transitions having large changes in firing fraction. This helps to reduce the transition time minimizing $\text{NVH}_{pattern}$. A further feature is that some transitions have such a small change in firing fraction that the slew rate can be set to 100%, i.e. a step function change in the firing fraction. The firing fraction values derived from the slew rate in table 800 and initial firing fraction may be used as an input to a delta sigma converter to determine a firing sequence. In other embodiments an appropriate firing sequence can be determined directly using a look up table of various firing sequences that can be used to transition between different firing fractions.

The actual slew rated used during any given transition may be modified from those given in look up table 800 based on engine operational conditions and driver input. For example, if a driver rapidly depresses or releases the accelerator pedal the transition actual slew rates may be increased to make the vehicle more responsive. In some cases the table may be not used and the firing fraction may immediately change to its target value. This will likely have significant NVH consequences, but large, fast accelerator pedal position changes may indicate a safety issue, which takes priority over NVH concerns. High engine speeds result in more firing opportunities within a given time window. Thus it is possible to have a transition time in the vicinity of 200 ms, while having a slower actual slew rate. Changes in intake/exhaust valve timing may influence the amount of air inducted during each firing event, thus impacting the rate of intake manifold filling/emptying. As such, the actual slew rate may be used to modify values from those shown in table 800 based on valve timing. Engine speed also influences the amount of air inducted by a cylinder, so it may also impact the actual slew rate. It should be appreciated that rather than having a single two dimensional look up table similar to that shown in FIG. 8 and modifying actual slew rate values, higher dimensionality tables could be used which incorporate additional variables as indices, i.e. valve timing, engine speed, etc.

As suggested above, a brief delay may also be imposed before beginning the transition. The length of the delay can vary based on the nature of the change and design choices for a particular engine which may involve a number of tradeoffs in terms of desired responsiveness, NVH considerations and design simplicity. By way of example, delays on the order of 1 to 10 firing opportunities have been found to work well in various implementations. Depending on the engine speed and number of engine cylinders this delay can be several milliseconds to on the order of 100 milliseconds. Alternatively, in some cases it may be desirable to delay motion of the throttle and initiation of a change in the manifold absolute pressure until after a transition in the firing fraction has begun. This type of delay may be particularly advantageous in transitions from higher to lower firing fractions, where spark timing adjustment can be used to decrease the per cylinder torque output. Also, in some cylinder activation/deactivation methods there may be a delay between making a decision to change the firing fraction and the implementation of the decision. Thus, the manifold pressure may already be changing by the time the actual change in firing fraction begins. The appropriate value for the delay may be found in a look up table similar to that shown in FIG. 8, where the entries now correspond to the delay associated with various transitions. The actual delay values used may be modified from those listed in the table in a manner similar to that described relative to FIG. 8. Alternatively, the delay values may not be listed in a look up table, but may be determined based on engine parameters and operational conditions.

Figure 3A:
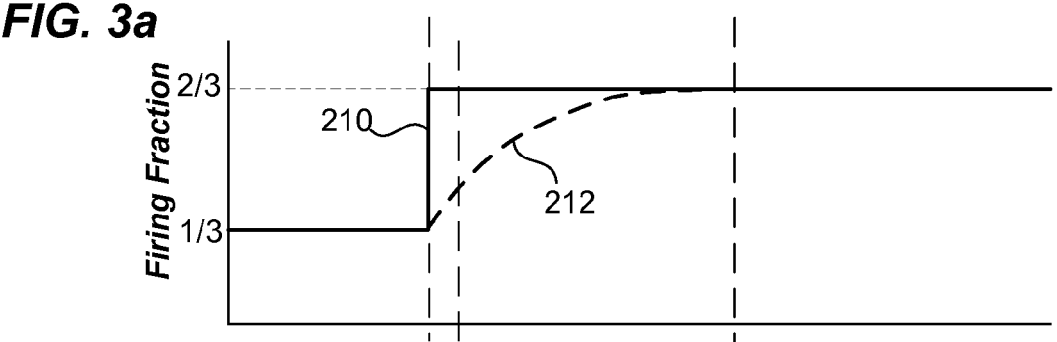
FIGS. 3(a)-3(d) are a set of graphs showing the requested and adjusted firing fractions, throttle position, intake manifold pressure and overall engine torque during a representative intended constant torque transition between a firing fraction of $\frac{1}{3}^{rd}$ and a firing fraction of $\frac{2}{3}^{rd}$ utilizing a first order band pass filter to smooth the transition.

A very significant challenge in control occurs when it is desired to change the firing fraction while holding the produced engine torque constant. This may be considered a limiting case of small changes in torque request causing a change in the required firing fraction. FIG. 3(a)-3(d) depicts, in simplified form, engine operation in such an idealized case. FIG. 3(a)-3(d) illustrate the requested and adjusted firing fractions, throttle position, intake manifold absolute pressure (MAP), and overall engine torque output during an intended constant torque transition between a firing fraction of $\frac{1}{3}^{rd}$ and a firing fraction of $\frac{2}{3}^{rd}$. In FIG. 3(a) the requested firing fraction 210 is shown as a step function between the initial value of $\frac{1}{3}^{rd}$ and the final value of $\frac{2}{3}^{rd}$. The step occurs at a time $t_1$, which can be set to zero and defines the start of the transition. The adjusted firing fraction 212 is shown tracking the requested firing fraction until the time $t_1$ and then following a trajectory described by a first order low pass filter. At a time at the end of the transition, $t_{tr}$, the requested and adjusted firing fractions are again equal.

It should be appreciated that the transition time, $t_{tr}$, can vary depending on a variety of conditions such as torque request, engine speed, transmission gear, and cylinder load in the initial and final states. The transition time is generally chosen to provide acceptable NVH performance as discussed in relation to FIG. 2.

Figure 3B:
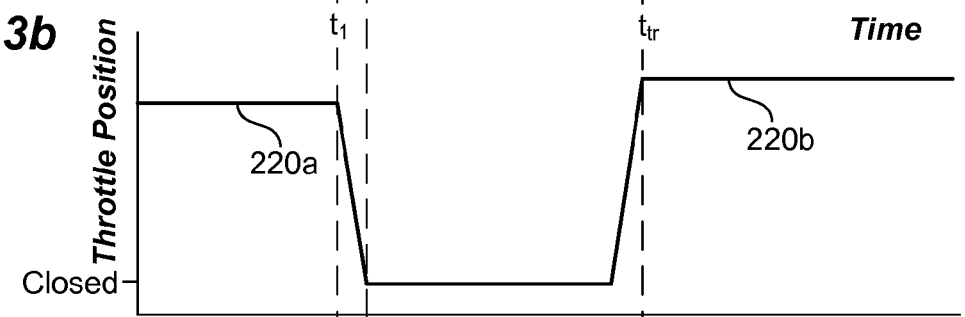

FIG. 3(b) shows the response of the throttle blade position 220 versus time. The first initial throttle position 220a remains constant until the start of the transition at time $t_1$. A feed forward control algorithm may be used to control the throttle blade position, since will reduce the overall transition time reducing $\text{NVH}_{pattern}$. Since in this transition the target MAP is lower than the initial MAP, the throttle will close during the transition to help reduce the MAP. The throttle moves to a closed position over a time period, $T_{th}$. The duration of $T_{th}$ is defined at least in part by the delay in processing the requested firing fraction signal into a new throttle position and the time necessary to physically move the throttle blade. This time can be quite small, approximately 20 msec, on the order of 1 or several firing opportunities. The throttle blade stays in the closed position over a majority of the transition. It moves to its final target position 220b near the end of the transition. It stays in a substantially constant position throughout the remainder of the transition. In FIG. 3b the second target throttle position is more fully open than the first initial throttle position. This may seem counter intuitive, since the second target MAP is lower than the first initial MAP; however, since FIGS. 3a-d depict an idealized constant torque transition the engine air induction should be similar between the initial and target operating conditions. Difference in the air induction level will arise from differences in engine efficiency. At the second target condition the pumping losses are greater, since MAP is lower, and thus the engine would need more air to produce the same torque. Other factors that influence engine efficiency include spark timing, intake/exhaust valve timing and lift, and cylinder load. In general these variables may cause more or less efficient operation in the initial or target operating conditions, thus the target throttle position may be more or less open than the initial throttle position.

It should be appreciated that the throttle trajectory depicted in FIG. 3(b) is a representative idealized throttle trajectory. In practice other types of throttle trajectories may be used such as closed loop control of MAP, closed loop MAP with additional feed forward throttle control. The position of the throttle during the transition can vary and the final throttle position may be higher, similar to or lower than the initial value.

Figure 3C:
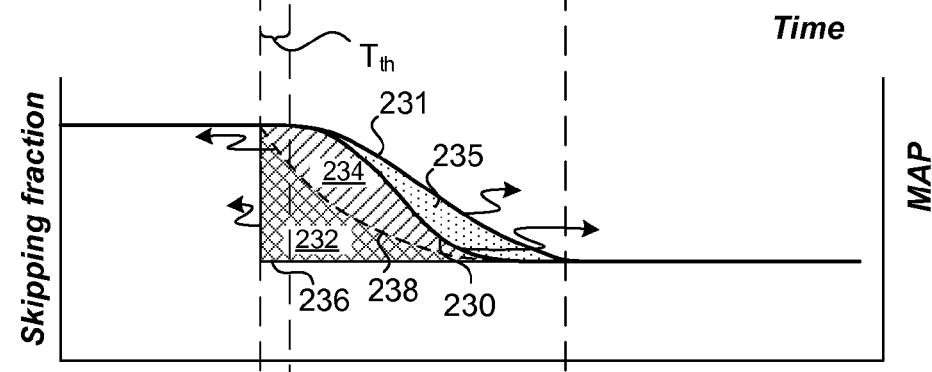

FIG. 3(c) shows the MAP and skipping fraction as a function of time. The skipping fraction is defined as one minus the firing fraction. The requested skipping fraction 236 and the resultant requested MAP 230 and the adjusted skipping fraction 238 and resultant adjusted MAP 231 are both shown. The two manifold pressures 230 and 231 and skipping fractions 236 and 238 are substantially constant until the beginning of the transition at time $t_1$. The requested MAP 230 begins to drop in response of the closing of the throttle plate and the removal of air from the intake manifold by induction into the cylinders. As previously described the MAP 230 response is relatively slow because of the filling/emptying dynamics of the intake manifold. The requested skipping fraction 236 mirrors the response of the firing fraction 210 shown in FIG. 3(a) and has a step function drop at the beginning of the transition. The adjusted skipping fraction 238 has a more gradual transition. The more gradual transition associated with the adjusted skipping fraction 238 results in a slower pump down of the intake manifold resulting in the adjusted MAP 231 transitioning more slowly than the requested MAP 230. If other engine parameters are fixed, the product of the MAP and firing fraction is substantially proportional to the engine torque output. For a constant torque output this implies that that the MAP and skipping fraction should track each other, i.e. their product should be substantially constant through the transition. The extent of MAP and skipping fraction divergence is indicative of the torque mismatch. The areas 234 and 235 define the mismatch associated with the adjusted firing fraction and are proportional to the excess torque generated by the adjusted firing fraction 212. Similarly the sum of area 232 and 234 is proportional to the excess torque generated by the requested firing fraction 210.

Figure 3D:
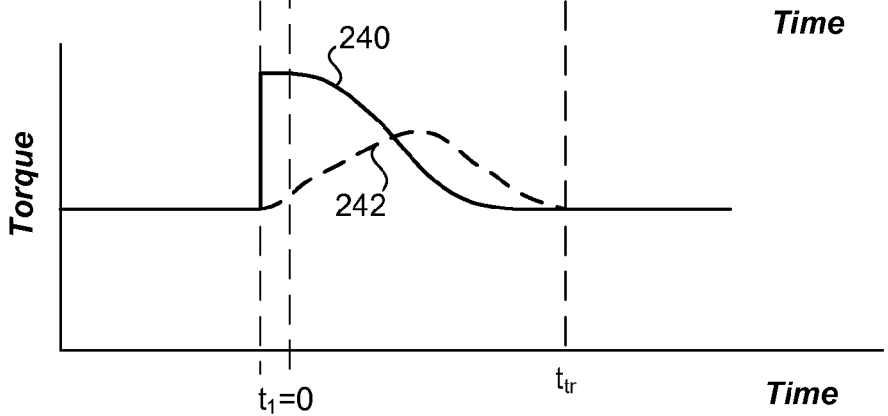

The torque surge associated with this mismatch between the firing fraction and MAP is more clearly shown in FIG. 3(d). The torque surge that would occur based on an immediate transition of the firing fraction to the target firing fraction is illustrated by curve 240. By contrast the torque surge generated through the use of the adjusted firing fraction is illustrated by curve 242. It can be seen that the overall torque surge is significantly reduced through the use of a filter to smooth the transition, although the duration of the surge may be extended somewhat due to the fact that the intake manifold pressure is not pumped down as quickly. The net torque surge is the integral of the torque mismatch over the duration of the mismatch. Although using a first order filter to smooth the transition between firing fractions can significantly reduce the torque surge/sag associated with a transition, it can be difficult to define a filter (or set of filters) that work well over a wide variety of operating conditions and over the entire range of possible firing fraction changes. One reason for this is that changes arising from a linear filter are proportional to change in the fraction while enduring for the same amount of time. So for example, a change from ½ to 1 will be twice as large as a change from ½ to ¾, but will occur in the same time period. Manifold dynamics, especially emptying, tend to be different. Instead of changing faster with larger changes, the rate of change is similar, but the duration of the change is longer. Another aspect of a linear filter is that the response to a step change, like that seen when the firing fraction changes, has the greatest change in output at the time of the step, and a decreasing amount of change with each succeeding step. Not only does this not match the physical behavior, it also worsens the consequences of misalignment of the start of the firing fraction transition with the physical behavior of the manifold.

A linear slew rate transition management strategy may be implemented in place of the prior art filter schemes to help further reduce the torque surge/dip and vibration in a number of applications. Some of the potential advantages of this approach will be schematically described with reference to FIG. 4. More specifically, FIGS. 4(a)-4(d) generally show the same type of information as shown in FIGS. 3(a)-3(d), except that the figures diagrammatically compare the exemplary use of a delayed linear slew rate to an exemplary first order filter. It should be appreciated that the figures are diagrammatic in nature and are intended to illustrate the concepts rather than reflect data from a specific test since the nature of the curves in practice will necessarily depend heavily on a number of variables including engine speed and operating conditions, the nature of the filter's transfer function, the designated slew rate, the delay incorporated, etc.

Figure 4A:
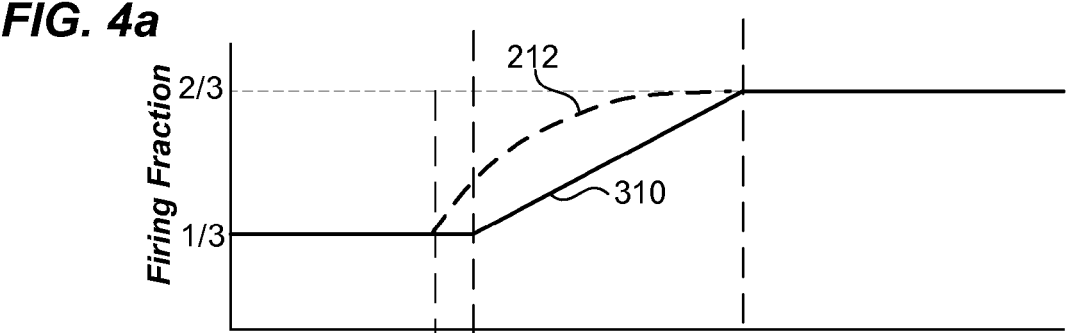
FIGS. 4(a)-4(d) are a set of graphs showing two types of adjusted firing fractions, throttle position, intake manifold pressure and overall engine torque in a representative intended constant torque transition between a firing fraction of $\frac{1}{3}^{rd}$ and a firing fraction of $\frac{2}{3}^{rd}$ utilizing a delayed linear slew in accordance with one embodiment of the invention.

Initially, FIG. 4(a) compares a filtered firing fraction change 212 to a firing fraction change trajectory 310 that might be seen when using a delayed linear slew rate. The filtered firing fraction change 212 is identical to that shown in FIG. 3(a). In firing fraction trajectory 310, the commanded firing fraction 310 remains at the original firing fraction from $t_1$ (the start of the transition) for a designated delay period $T_D$. The time delay, $T_D$, may be larger or smaller than the throttle transition time $t_{th}$. The appropriate time delay $T_D$ can vary based on a number of factors including manifold filling/emptying dynamics, throttle response time, etc. After the delay, the firing fraction 310 rises linearly until it reaches the target firing fraction.

Figure 4B:
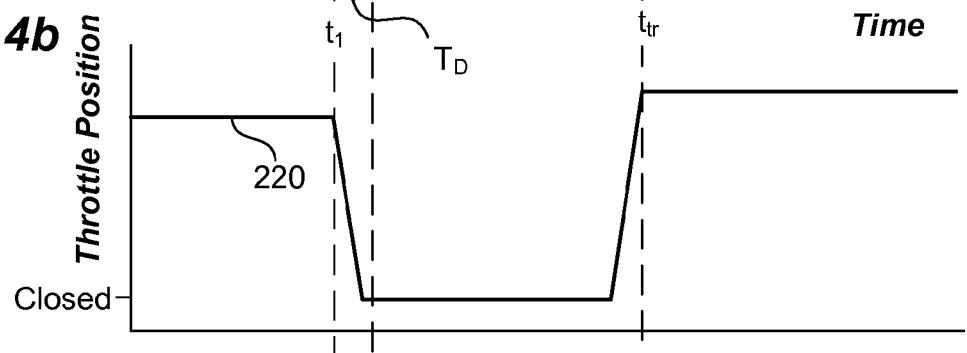
Figure 4C:
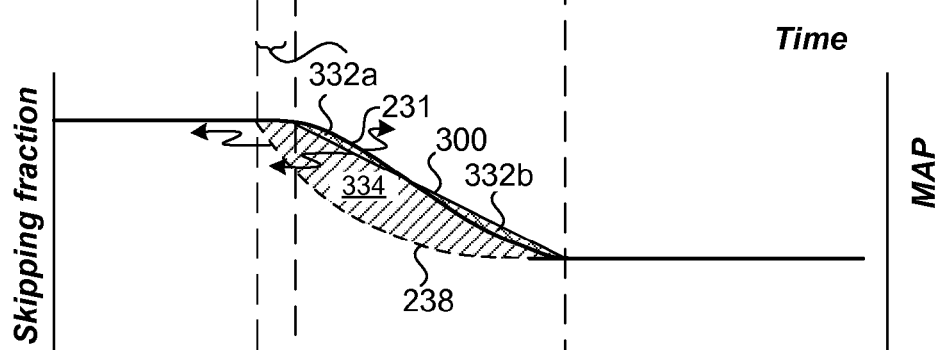

FIG. 4(b) shows the response of the throttle position 220 versus time. This figure is identical to FIG. 3(b) and the description will not be repeated. FIG. 4(c) shows the MAP and skipping fraction as a function of time. In FIG. 4(c) the filtered skipping fraction 238 and resultant MAP 231 are identical to that shown in FIG. 3(c). The torque mismatch associated with the filtered firing fraction is depicted by the areas 334 and 332a. This area is equivalent to that depicted in FIG. 3(c). The delayed linear slew skipping fraction 330 mirrors the changes in the firing fraction 310. The torque mismatch associated with the delayed linear slew is depicted by areas 332a and 332b. Area 332a is associated with a torque surge, while area 332b is associated with a torque lag. For clarity this figure assumes that the MAP 231 associated with both the filtered and delayed linear slew are equal, whereas in practice they will be somewhat different due to the different pump down rates associated with the different firing fraction trajectories.

Figure 4D:
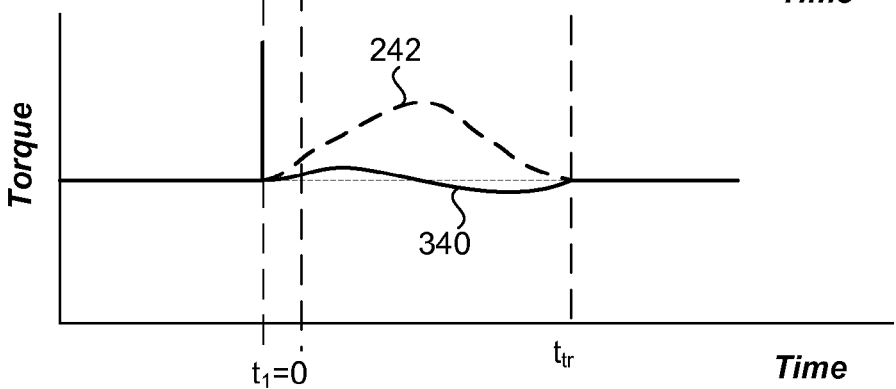

FIG. 4(d) shows the resultant torque between the two cases. Curve 242 illustrates the torque produced using the filtered firing fraction and is identical to that shown in FIG. 3(d). Curve 340 illustrates the torque produced using a delayed linear slew rate change in the firing fraction. The torque mismatch associated with the delayed linear slew rate change in firing fraction is significantly less than that associated with the filtered changed demonstrating the advantage of this control method.

When a linear slew rate is utilized, both the slope of the linear slew and the length of the delay (if any) will each have a direct impact on both the magnitude and sense of the torque mismatch. Various engine characteristics and operating parameters will also affect the torque mismatch (e.g., engine speed, manifold characteristics, spark timing, valve timing, valve lift, air/fuel stoichiometry, etc.). When the linear slew rate is selected such that it closely approximates the manifold filling dynamics, the torque surge or lag associated with a transition can be significantly reduced. Indeed, it has been observed that in many transitions, a properly selected linear slew rate can more closely track the manifold filling dynamics than the described first order filter. It should, however, be appreciated that the magnitude of a surge or lag can vary significantly based on how closely (or how poorly) the selected slew rate approximates the manifold filling dynamics.

Figure 5:
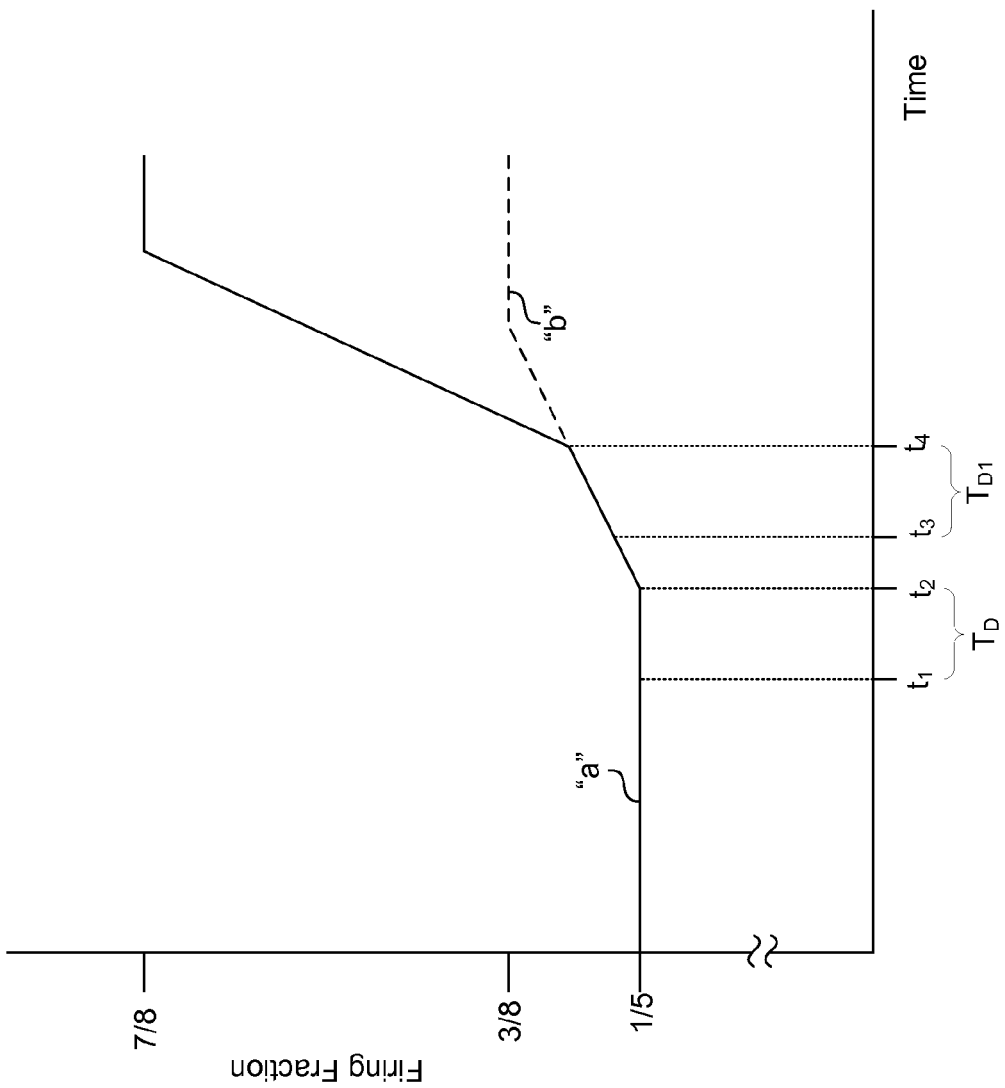
FIG. 5 is a graph showing the firing fraction (Y-axis) as a function of time (X-axis) during a representative interrupted transition where a second firing fraction transition is requested while a first transition is in progress.

There are times when a transition may be interrupted by a new target firing fraction request. That is, in the middle of a transition from a first firing fraction to a second firing fraction, there may be times when a second change request is made. In such a case, the transition unit may begin implementing the second change from the current state rather than waiting for the first transition to be completed. For example, consider a circumstance in which the firing fraction determining unit 30 requests a change to a firing fraction of ⅞ while the transition adjustment unit 40 is in the middle of a transition from a firing fraction of ⅕ to ⅜. Such a situation is graphically represented in FIG. 5 which is a graph showing the firing fraction (Y-axis) as a function of time (X-axis). In the illustrated embodiment, the engine is initially operating at a firing fraction of ⅕ as represented by line segment "a". At time $t_1$, the requested firing fraction increases to ⅜. After the designated delay ($T_D$ in the illustrated embodiment), the transition towards the ⅜ firing fraction begins at time $t_2$ using the designated slew rate (1% in this case, see FIG. 8). At time $t_3$ a change request to ⅞ is received—even though the transition to ⅜ has not yet been completed. The transition towards the ⅜ firing fraction continues during the designated delay, but once the designated delay is completed at $t_4$, the transition to a firing fraction of ⅞ begins at the designated slew rate. The delay $T_{D1}$ between the decision to change the target firing fraction, occurring at $t_3$, and the change in slew rate, occurring at $t_4$, may be different than the delay associated with the beginning of the transition $T_D$. In some cases the delay $T_{D1}$ may be zero, although in many cases there is an inherent delay between a firing decision and the implementation of that decision due to the cylinder activation/deactivation mechanism. In the illustrated embodiment, the designated delays are the same for both changes, although that is not a requirement. In this case the slew rate associated with the transition between ⅕ and ⅞ is 2% (see FIG. 2) There is an inflection point in the firing fraction slew rate at time $t_4$. Often larger changes between the initial and final firing fraction will result in a faster slew rate to avoid excessive pattern induced NVH. In this example the magnitude of the change from the current firing fraction to ⅞ is greater than the magnitude of original change from ⅕ to ⅜—so the slew rate is increased. In some cases the relative slew rate, i.e. the ratio of the slew rate to the total change in firing fraction may be held approximately constant through the transition. In other cases it may be desirable to leave the slew rate fixed throughout the entire transition. For reference, the dashed line labeled "b" shows the completion of the change to a firing fraction of ⅔ as if the second change had not been requested. Although only a single mid-transition change is represented, it should be appreciated that the same principles can be applied to implement any further changes that are requested during a transition. These can include both increases and decreases in the requested firing fraction, multiple sequential change requests that occur rapidly enough such that a plurality of intermediate firing fractions are never actually attained, etc.

Torque Management

As suggested above, transitions are generally smoother when the torque delivered during the transition matches the desired torque. One of the prime reasons for controlling the firing fraction in conjunction with the air charge in the described manner is to help reduce torque variations—which tends to help reduce undesired vibrations. When air charge/firing fraction mismatches occur the output of the engine can be modulated in other manners. One such approach is to control the spark timing in a manner that mitigates such torque variations. Generally when operating at an allowed firing fraction level the spark timing is set at or near a timing that provides for optimum fuel efficiency, i.e. maximum torque for a given MAC, typically denoted as the maximum brake torque (MBT) operating point. When the firing fraction increases and the air charge is reduced, a torque surge would naturally occur when the firing fraction increases faster than the corresponding decrease in the air charge. This surge can be mitigated by retarding the spark appropriately during the transition in a manner that provides more steady torque output. In general, retarding the spark can reduce the output of each firing as is well understood by those familiar with the art. If the spark timing prior to the transition did not correspond to the maximum torque timing, the spark can be advanced a limited amount to provide slightly more torque per firing, although knock, misfire considerations, etc. typically limit the practicality of using spark advance. Therefore, the spark retard approach is particularly useful in avoiding a torque surge. Such conditions exist when the firing fraction increases more quickly than the manifold can be emptied in a low to high firing fraction transition or if the manifold begins filling before a change in the firing faction in a high to low firing fraction transition. Generally use of firing fraction or air charge delay can be used to mitigate the torque mismatch, allowing slightly more than requested torque (if uncorrected), which can be reduce by modest spark retard. A relatively short firing fraction ramp, i.e. high slew rate, can then be used to reduce the mismatch between the firing fraction and air charge. The firing fraction slew rate can be defined either in terms of time or some parameter based on engine speed, such as crank angle, firings or firing opportunities.

An advantage of using spark timing control to help ensure that the engine provides the desired torque throughout the entire transition is that the spark is easy to control and can be adjusted very quickly. As suggested above, spark retard can be used to reduce the torque mismatch throughout an increasing firing fraction transition. In some cases spark retard alone may be sufficient to eliminate the mismatch; however, in other cases the air charge lag may be too great to be compensated by spark retardation without compromising combustion stability. In all cases an undesirable side effect of retarding spark to reduce engine output is that retarding spark will generally reduce fuel efficiency. Therefore, to the extent possible, it is generally preferable to match the air charge to the skipping fraction throughout the transition as described above to avoid, or at least reduce, the fuel efficiency losses associated with spark retard control.

Figure 6A:
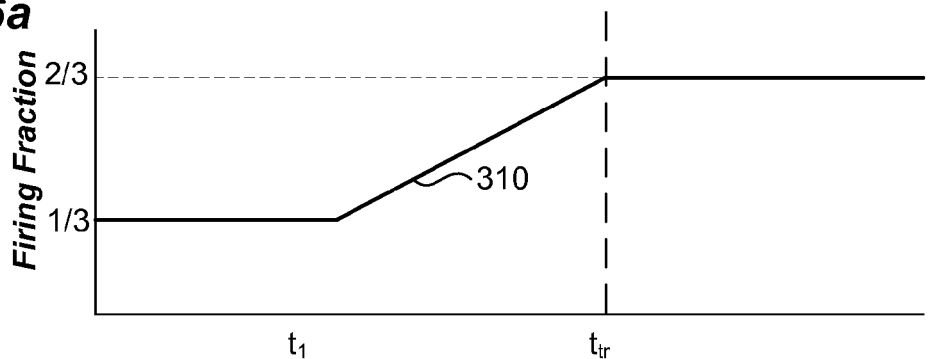
FIGS. 6(a)-6(d) are a set of graphs showing the adjusted firing fraction, intake manifold pressure, spark timing, and overall engine torque in a representative intended constant torque transition between a firing fraction of $\frac{1}{3}^{rd}$ and a firing fraction of $\frac{2}{3}^{rd}$ utilizing a delayed linear slew in accordance with one embodiment of the invention.
Figure 6B:
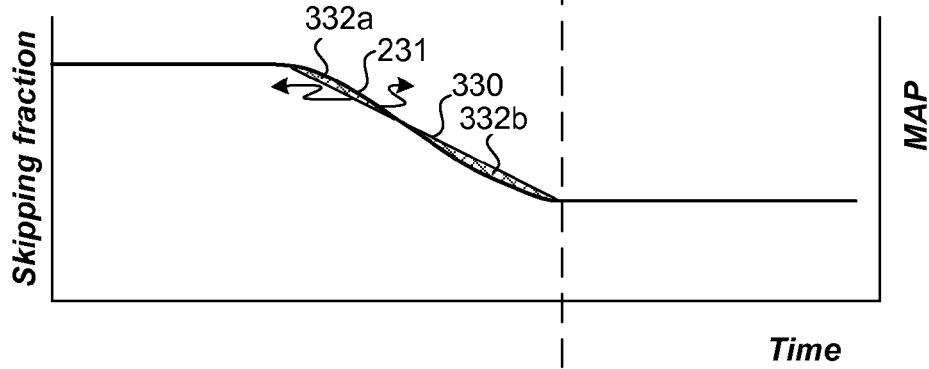
Figure 6C:
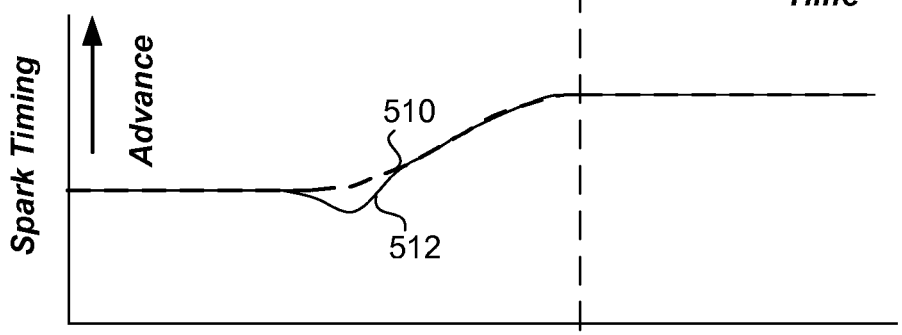
Figure 6D:
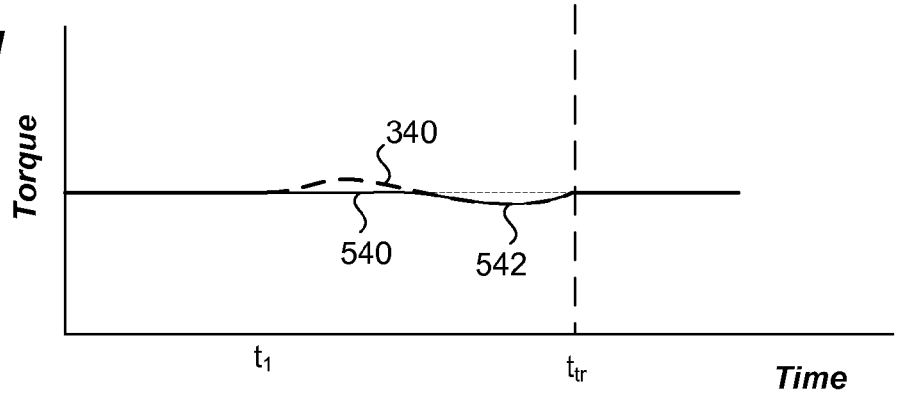

For comparison purposes, FIGS. 6(a)-6(d) illustrate the firing fraction, manifold pressure, spark advance and overall engine torque output during an intended constant torque transition utilizing spark retard in conjunction with a delayed linear slew to further help mitigate the torque surge. Like in FIGS. 3(a)-(d) and 4(a)-(d), the transition is from a firing fraction of $\frac{1}{3}^{rd}$ to a firing fraction of $\frac{2}{3}^{rd}$. The change in the throttle position is similar to that depicted in FIG. 3(b) and FIG. 4(b) and is not depicted in FIGS. 6(a)-6(d). In these figures the initial spark timing is optimized for maximum brake torque, the most efficient operating point. FIG. 6(a) shows the change in the firing fraction 310 over the course of a firing fraction transition managed using a delayed linear slew transition approach described with respect to FIG. 4. FIG. 6(b) shows the corresponding change in MAP 231 and skipping fraction 330 over the transition. The areas 332a and 332b illustrate areas of mismatch between the skipping fraction 330 and the MAP 231. As shown in FIG. 4(d) these areas correspond to regions of torque mismatch if no corrective measures are taken. FIG. 6(c) illustrates the change in the spark timing during the transition. If the spark timing is held at its maximum efficiency the result is curve 510. However, it may be desirable to deviate from this maximum efficiency so that the torque surge can be eliminated. This type of adjustment is depicted in curve 512. The spark is retarded at the beginning of the transition to eliminate the torque bump seen in FIG. 4(d). FIG. 6(d) shows the resultant impact on torque. The spark adjusted torque 540 shows no torque surge at the beginning of the transition due to the spark retardation reducing the per cylinder output. The torque dip 542 near the end of the transition cannot be removed using spark timing, since the spark timing is already adjusted to its maximum efficiency point.

In some cases the torque dip 542 may be undesirable. In such cases reducing the delay $T_D$ will result in the MAP 231 always being above and to the right of the skipping fraction 330 in the transition. In this case the engine would always be producing excess torque, which could be removed by retarding the spark timing. While this improves NVH, it will reduce fuel efficiency. In other cases an engine may be generally operating with a spark timing somewhat different than the timing that yields maximum efficiency, typically denoted as the maximum brake torque (MBT) point. In this case the engine has a torque reserve such that by controlling spark timing the engine torque can be both increased and decreased. Operating an engine with torque reserve has the undesirable effect of reducing fuel efficiency, so firing fraction transition control strategies described herein minimize the need to operate away from MBT spark timing.

Some engine controllers have the ability to cut off the delivery of fuel to a cylinder while still opening the valves in the regular manner. This technique causes intake air to be pumped through the cylinders and effectively cuts the engine's output to zero. Currently, the most common use of fuel cutoff is during deceleration wherein fuel is typically cut off from all working chambers—a practice commonly referred to as deceleration fuel cutoff (DFCO).

During skip fire transitions that would otherwise result in a torque surge (e.g., increasing firing fraction while decreasing air charge) a somewhat similar approach can be used to help balance the air charge with changes in the firing fractions. Specifically, during skip fire control, selected working cycles are not fired. Generally, the cylinders associated with skipped working cycles are deactivated so that they do not pump air through the cylinder during a skipped working cycle. However, if it is desirable to reduce the amount of air in the manifold, the valves associated with selected skipped working cycles can be activated to pump air through the corresponding cylinders during the skipped working cycles. Since the working cycles are intended to be skipped, no fuel is delivered to the working chambers and no combustion occurs.

The number of skipped working cycles that are appropriately used to pump air through the engine block for any particular transition will vary based upon the nature of the transition. For example, factors such as the intake manifold dynamics, the initial and target firing fractions, the initial and target air charges, the firing fraction slew rate utilized, the engine speed, the otherwise expected torque surge, etc. can all impact both the number of working cycles appropriately used to pump air through the cylinder and their respective timing. Some advantages of using the air pumping approach include that it can save fuel relative to other torque mitigation approaches (e.g. spark retard) and it helps speed the transition by helping more rapidly reduce the manifold pressure to the desired level. A potential drawback or limitation of this approach is that the emissions system (e.g. catalytic converters) must be able to handle the air passed through the engine and not all emissions systems will have that ability all of the time. However, when practical, the use of skipped cylinders to pump excess air out of the manifold during firing fraction transitions can be a synergistic use of skipped working cycles during skip fire control.

Figure 7:
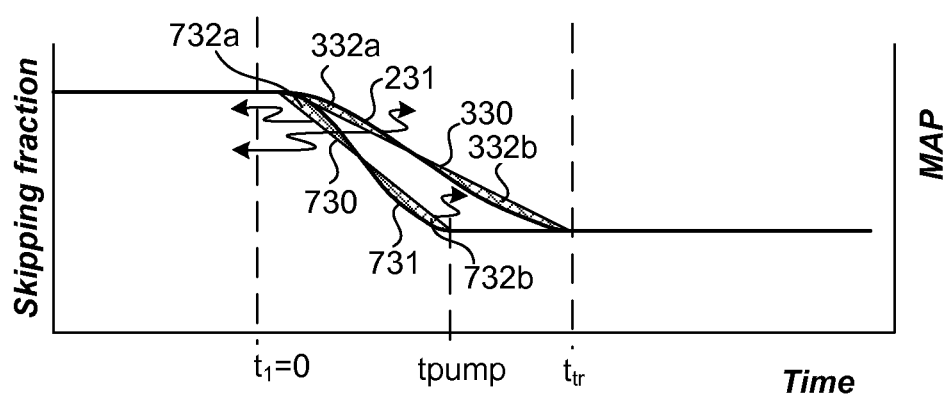
FIG. 7 is a graph showing the adjusted skipping fraction and intake manifold pressure in a representative intended constant torque transition between a firing fraction of $\frac{1}{3}^{rd}$ and a firing fraction of $\frac{2}{3}^{rd}$ utilizing a delayed linear slew and pumping air through deactivated cylinders in accordance with one embodiment of the invention.

Pumping air through some or all of the skipped cylinders has the advantage of more quickly reducing MAP, thus allowing a faster transition with potentially lower levels of NVH. FIG. 7 illustrates the MAP and possible skipping fractions in two cases, a case without pumping air and a case of pumping air. The transition begins at time $t_1$. The case without pumping is equivalent to that previously discussed in relation to FIG. 6(b). The skipping fraction 330 is substantially matched to the MAP 231 with relatively small mismatch areas 332a and 332b. The case with pumping by the skipped cylinder has a much faster drop in the MAP 731 and consequentially the skipping fraction 730 can change more quickly and still be substantially matched to the MAP 731. The mismatch areas 732a and 732b are similar in size to those associated with the non-pumping transition 332a and 332b. The total transition time $t_{pump}$ is much shorter than the previous transition time $t_{tr}$. As seen in FIG. 2 shorter transition times are advantageous if $NVH_{mismatch}$ can be held to an acceptable level, since they have lower $NVH_{pattern}$ and thus potentially lower overall NVH. Under certain conditions, the transition time can even be reduced to zero, i.e. the target fraction is reached in a step function transition on the following working cycle.

An alternative method to adjust the filling/emptying of the intake manifold is to change the intake and exhaust valve timing. For cam operated valves this is done by adjusting the cam phasor, which controls the relative timing of the valve opening and closing. For engines with variable valve lift or electronically controlled valves greater control is possible. In all cases valve motion may be adjusted to provide a desired MAC for a given MAP (within the system control range). This allows another degree of control during the transition. In some cases the valve timing used during the transition may also be used at the final firing fraction level.
Feed Forward Air Control As previous discussed in regard to FIGS. 3b and 4b an engine controller may use feed forward control of the throttle to accelerate desired changes in manifold pressure. The example illustrated used a simple step function change in the commanded throttle position to adjust the MAP. However, more complex control schemes on the throttle may be used to achieve a faster transition in the MAP. Some control schemes may integrate a feed forward control architecture with various types of feedback control, such as a PID (proportional, integral, differential) controller or state-space controller to better control MAP response. In general, feed forward throttle control contemplates opening or closing the throttle more than would be appropriate for steady state operation during the transition and then backing off to the level appropriate for steady state operation. Using feed forward throttle control during transitions between different firing fractions can help accelerate the transition in a controlled manner which can help further reduce vibration. Since the transition occurs more quickly, a higher slew rate can typically be used during such transitions.

Most of the discussion above has focused on the use of a throttle as the primary mechanism to vary the air charge in each cylinder. As will be appreciated by those familiar with engine operation, there are other way to vary the air charge as well including valve timing control, intake/exhaust valve timing and lift control, supercharging, etc. Where practical, feed forward control can be used to control the air charge using these air charge control mechanisms in addition to, or in place of the described feed forward throttle control. For example, if electronic valves are provided, the opening and closing timing of each valve can readily be controlled to facilitate more rapid transitions in a desired air charge. When the valve train is controlled by one or more camshafts, feed forward control of the cams or camshafts can be used to facilitate more rapid transitions of the air charge. Similarly, when the valve train supports variable valve lift, appropriate control of the valve lift (including feed forward control) can be used to better match the air charge to the firing density. When the engine includes suitable hardware, any of these air charge control mechanism can be used in parallel.

The described feed forward air control can be used independently or in combination with spark retard, and/or pumping air through deactivated cylinders and/or the described firing fraction transition slew rate control. A desirable characteristic of feed forward air control is that it can be used in conjunction with both increases and decreases of the firing fraction.

Although only a few embodiments of the invention have been described in detail, it should be appreciated that the invention may be implemented in many other forms without departing from the spirit or scope of the invention. For example, the transition slew rate limiting has been described primarily in the context of using constant linear slew rates throughout the transition. Although such an approach works well, it should be appreciated that more complex slew rates can be used when desired—which may be useful to better track specific manifold filling and/or emptying dynamics and/or other design considerations. For example, in some implementations, it may be desirable to divide the transition into two or more linear segments or to define a more complex transition function.

Some skip fire controllers are arranged such that they will inherently invoke a relatively large number of transitions under a variety of normal driving scenarios in an effort to maximize fuel economy. This is particularly true in driving conditions that support a relatively large set of firing fractions. By way of example, some driving tests by Applicant of a skip fire controller having up to 29 available firing fractions tend to average a transition every second or two during various normal driving profiles. For driving comfort, this makes it particularly desirable to utilize some of the transition management approaches described herein.

Several different techniques including firing fraction management, air delivery management and spark timing management have been described. Although each may be used independently, better results are often obtainable when used in combination with the goal of avoiding transitory torque surges or dips while facilitating rapid transitions between firing fractions.

In the foregoing description, there are several references to the term, "cylinder." The term cylinder should be understood as broadly encompassing any suitable type of working chamber. The figures illustrate a variety of devices, designs and representative cylinder and/or engine data. It should be appreciated that these figures are intended to be exemplary and illustrative, and that the features and functionality of other embodiments may depart from what is shown in the figures.

The invention has primarily been described in the context of dynamic skip fire operation in which an accumulator or other mechanism tracks the portion of a firing that has been requested, but not delivered, or that has been delivered, but not requested. However the described techniques are equally applicable to managing transitions between any different skip fire firing fractions or between a skip fire firing fraction (in which individual cylinders are sometimes fired and sometime skipped) and all cylinder operation (or operation using a fixed set of cylinders) as may occur when using various rolling cylinder deactivation techniques. Similar techniques may also be used to manage effective displacement transitions in variable stroke engine control in which the number of strokes in each working cycle are altered to effectively vary the displacement of an engine.

The present invention may also be useful in engines that do not use skip fire control. For example, although the invention is described primarily in the context of transitions between different firing fractions during skip fire control, the described techniques can also be used to facilitate transitions between different variable displacement states in more traditional variable displacement engines using a skip fire transition approach. For example, an eight cylinder variable displacement engine that has the ability to operate in a 4 cylinder mode (i.e., 4 fixed cylinders) will require transitions from a firing fraction of 0.5 to 1 and vice versa and could advantageously use the firing fraction transition management techniques described herein. Therefore, the present embodiments should be considered illustrative and not restrictive and the invention is not to be limited to the details given herein.

The invention claimed is:

1. A method of controlling the transition of an engine between different firing fractions, the method comprising:
    while the engine is operating at a first firing fraction, determining a second target firing fraction that is different than the first firing fraction; and
    transitioning from the first firing fraction to the target firing fraction by gradually altering a commanded firing fraction from the first firing fraction to the second firing fraction, wherein the commanded firing fraction is altered each firing opportunity.

2. A method of controlling the transition of an engine between different firing fractions, the method comprising:
    while the engine is operating at a first firing fraction, determining a second target firing fraction that is different than the first firing fraction; and
    transitioning from the first firing fraction to the target firing fraction by gradually altering a commanded firing fraction from the first firing fraction to the second firing fraction, wherein the commanded firing fraction is altered by substantially the same amount each firing opportunity.

3. A method as recited in claim 1 wherein:
    the commanded firing faction has an associated skip fraction which is a complementary fraction of the commanded firing fraction; and
    the commanded firing fraction is altered in a manner such that a product of the skipping fraction and the intake manifold pressure remains substantially constant throughout the transition.

4. A method as recited in claim 1 wherein the firing fraction is changed at substantially the same rate throughout the transition.

5. A method as recited in claim 1 wherein the commanded firing fraction is provided to a skip fire firing timing determining module that includes an accumulator functionality that tracks a portion of a firing that has been requested, but not delivered, or that has been delivered, but not requested.

6. A method as recited in claim 1 wherein the commanded firing fraction is changed each firing opportunity using a linear slew rate such that the amount that the commanded firing fraction is changed each firing opportunity is the same throughout the transition.

7. A method as recited in claim 2 wherein the commanded firing fraction is changed each firing opportunity using a linear slew rate such that the amount that the commanded firing fraction is changed each firing opportunity is the same throughout the transition.

8. A method as recited in claim 6 wherein the linear slew rate is in the range of 1-5% such that the commanded firing fraction increases in the range of 1 to 5 percent each firing opportunity.

9. A method as recited in claim 6 wherein the magnitude of the linear slew rate is selected at least in part based on the magnitude of the change in firing fraction and at least one engine operating parameter.

10. A method as recited in claim 1, wherein the transition period is in the range of 150 to 300 milliseconds.

11. A method as recited in claim 1, wherein the engine includes a multiplicity of working chambers and an intake manifold that supplies air to at least a plurality of the working chambers, the intake manifold having a manifold air pressure, the method further comprising:
    changing a commanded throttle position in conjunction with the transition between different firing fractions to facilitate operation at the target firing fraction, wherein initiation of the altering of the commanded firing fraction is delayed relative to initiation of the change in throttle position by a plurality of firing opportunity, thereby helping compensate for inherent delays associated with changing the manifold air pressure.

12. A method as recited in claim 1, wherein the engine includes a multiplicity of working chambers and an intake manifold that supplies air to at least a plurality of the working chambers, the method further comprising:
    determining a target manifold pressure associated with the target firing fraction, the target manifold pressure being different than an initial manifold pressure that exists when a decision to change firing fractions is made; and
    utilizing feed forward throttle control in conjunction with the transition to accelerate the transition of the manifold pressure to the target manifold pressure.

13. A method as recited in claim 1, wherein the engine includes a plurality of cylinders, a plurality of intake valves, each intake valve being associated with an associated one of the cylinders, a camshaft arranged to open and close the intake valves; and an intake manifold that supplies air to the cylinders through the intake valves, the method further comprising:
    determining a target air charge associated with the target firing fraction, the target air charge being different than an initial air charge that exists when a decision to change firing fractions is made; and
    utilizing feed forward camshaft control in conjunction with the transition to accelerate the transition of the air charge to the target air charge.

14. A method as recited in claim 1, wherein the engine includes a multiplicity of working chambers, each working chamber having an associated spark source, the method further comprising:
    determining a target spark timing associated with the target firing fraction, the target spark timing potentially being different than an initial spark timing that exists when a decision to change firing fractions is made; and
    retarding the spark relative to both the initial spark timing and the target spark timing for selected fired working chambers during the transition to mitigate or prevent a torque surge that would otherwise occur during the transition.

15. A method as recited in claim 14 wherein at least one of the initial and target spark timings is a spark timing that causes the engine to generate the maximum brake torque at the associated engine settings.

16. A method as recited in claim 1 wherein:
    the engine includes an intake manifold, an exhaust and a multiplicity of working chambers, each working chamber being arranged to operate in a succession of working cycles;
    at least one of the first and target firing fraction has a complementary skip fire firing fraction in which selected skipped working cycles are not fired;
    air is pumped through the engine from the intake manifold to the exhaust during selected skipped working cycles that occur during the firing fraction transition to more quickly reduce manifold pressure during the transition; and
    wherein air is generally not pumped through the engine during skipped working cycles that occur outside the firing fraction transition.

17. A method as recited in claim 1 further comprising changing at least one commanded engine operating parameter that affects a working chamber air charge in conjunction with the transition between different firing fractions to facilitate operation at the target firing fraction, wherein initiation of the altering of the commanded firing fraction is delayed relative to initiation of the change in the commanded engine operating parameter by a plurality of firing opportunity, thereby helping compensate for inherent delays associated with increasing or decreasing the amount of air in an intake manifold that provides air to the working chamber.

18. A method of controlling the transition of an engine from an initial firing fraction to a target firing fraction, there being an initial manifold pressure and a target manifold pressure, the target manifold pressure being lower than the initial manifold pressure and the target firing fraction being higher than the initial firing fraction, the method comprising:

operating the engine in a skip fire manner during the transition; and pumping air through the engine from an intake manifold to an exhaust during selected skipped working cycles that occur during the transition to more quickly reduce intake manifold pressure to the target manifold pressure; and wherein air is generally not pumped through the engine during skipped working cycles that occur outside the firing fraction transition.

19. A method of controlling the transition of an engine between different firing fractions, the engine including a multiplicity of working chambers, an intake manifold and an exhaust, the intake manifold having a manifold air pressure and being arranged to supply air to at least a plurality of the working chambers, the method comprising:

while the engine is operating at a first operational firing fraction, receiving a request to transition to a target second operational firing fraction that is different than the first operational firing fraction;

transitioning from the first operational firing fraction towards the target second operational firing fraction by gradually altering a commanded firing fraction from the first operational firing fraction towards the target second operational firing fraction; and changing a commanded throttle position in conjunction with the transition between the different firing fractions to facilitate operation at the target second operational firing fraction, wherein initiation of the altering of the commanded firing fraction is delayed relative to initiation of the change in throttle position by a plurality of firing opportunity, thereby helping compensate for inherent delays associated with changing the manifold air pressure.

20. A method as recited in claim 19 wherein when a request is received to transition to a third operational firing fraction before the transition to the target second operational firing fraction is completed, the method further comprises:

changing the commanded throttle position to a throttle position that facilitates operation at the third operational firing fraction in response to the request to transition to the third operational firing fraction;

continuing to transition towards the target second operational firing fraction during a designated delay period; and after the designated delay period has expired, transitioning from the then current firing fraction to the third operational firing fraction by gradually altering the commanded firing fraction from the then current operation firing fraction towards the third operation firing fraction.

21. A method as recited in claim 20 wherein the designated delay period is a defined time period.

22. A method as recited in claim 20 wherein the designated delay period is a defined number of firings or firing opportunities.

23. A method as recited in claim 19 wherein the commanded firing fraction is altered each firing opportunity.

24. A method as recited in claim 19 wherein the commanded firing fraction is altered by substantially the same amount each firing opportunity.

\* \* \* \* \*

UNITED STATES PATENT AND TRADEMARK OFFICE
CERTIFICATE OF CORRECTION

PATENT NO. : 9,745,905 B2
APPLICATION NO. : 14/857371
DATED : August 29, 2017
INVENTOR(S) : Pirjaberi et al.

It is certified that error appears in the above-identified patent and that said Letters Patent is hereby corrected as shown below:

In the Specification

1. Column 11, Line 45, delete the second occurrence of "that".

2. Column 13, Line 65, insert --.-- after "2)".

In the Claims

1. Claim 19 (Column 22, Line 2) change "opportunity" to --opportunities--.

Signed and Sealed this
First Day of October, 2019

Andrei Iancu
*Director of the United States Patent and Trademark Office*